United States Patent [19]

Breitscheidel

[11] Patent Number: 4,740,258
[45] Date of Patent: Apr. 26, 1988

[54] PROCESS FOR EMBOSSING FLEXIBLE SHEETS OF FOAM MATERIAL

[75] Inventor: Hans-Ulrich Breitscheidel, Siegburg, Fed. Rep. of Germany

[73] Assignee: Dynamit Nobel AG, Fed. Rep. of Germany

[21] Appl. No.: 728,868

[22] Filed: Apr. 30, 1985

Related U.S. Application Data

[63] Continuation of Ser. No. 559,699, Dec. 9, 1983, abandoned.

[30] Foreign Application Priority Data

Dec. 15, 1982 [DE] Fed. Rep. of Germany ....... 3246368

[51] Int. Cl.[4] .......................... B32B 5/18; B29C 59/04
[52] U.S. Cl. ..................................... 156/209; 156/220; 156/311; 264/284; 264/321
[58] Field of Search .................. 156/78, 209, 219, 220, 156/245, 311, 498, 499; 264/284, 321, 46.2, 46.3, 48, DIG. 16, DIG. 65, DIG. 66

[56] References Cited

U.S. PATENT DOCUMENTS

| | | | |
|---|---|---|---|
| 2,681,612 | 6/1954 | Reimann | 264/284 |
| 2,776,451 | 1/1957 | Chavannes | 264/284 |
| 2,783,175 | 2/1957 | Smith et al. | 264/284 |
| 2,915,787 | 12/1959 | Ewing et al. | 264/284 |
| 3,305,419 | 2/1967 | Voelker | 156/209 |
| 3,496,043 | 2/1970 | Ragan | 156/209 X |
| 3,608,006 | 9/1971 | Hosoda | 264/DIG. 12 X |
| 3,657,036 | 4/1972 | Mullenhoff et al. | 156/209 X |
| 3,966,383 | 6/1976 | Bussey, Jr. et al. | 264/284 X |
| 4,022,643 | 5/1977 | Clark | 156/209 X |
| 4,229,406 | 10/1980 | Pollock | 264/321 |
| 4,364,892 | 12/1982 | Rehlen et al. | 264/284 |

FOREIGN PATENT DOCUMENTS

| | | | |
|---|---|---|---|
| 54-149779 | 11/1979 | Japan | 156/209 |
| 1095290 | 2/1967 | United Kingdom | 264/284 |

*Primary Examiner*—Donald E. Czaja
*Assistant Examiner*—Ramon R. Hoch
*Attorney, Agent, or Firm*—Antonelli, Terry & Wands

[57] ABSTRACT

A process is disclosed for the continuous embossing of the surface of flexible (i.e., soft-elastic) sheets or lengths of foam material optionally laminated to a synthetic resin film or a flat textile form or facing wherein the sheet of foam material is superficially plasticized by heating and is exposed to an embossing pressure by means of a perforated metallic embossing belt or band in accordance with a desired embossing pattern. The belt is removed after cooling and solidification of the embossed surface of the sheet of foam material.

19 Claims, 1 Drawing Sheet

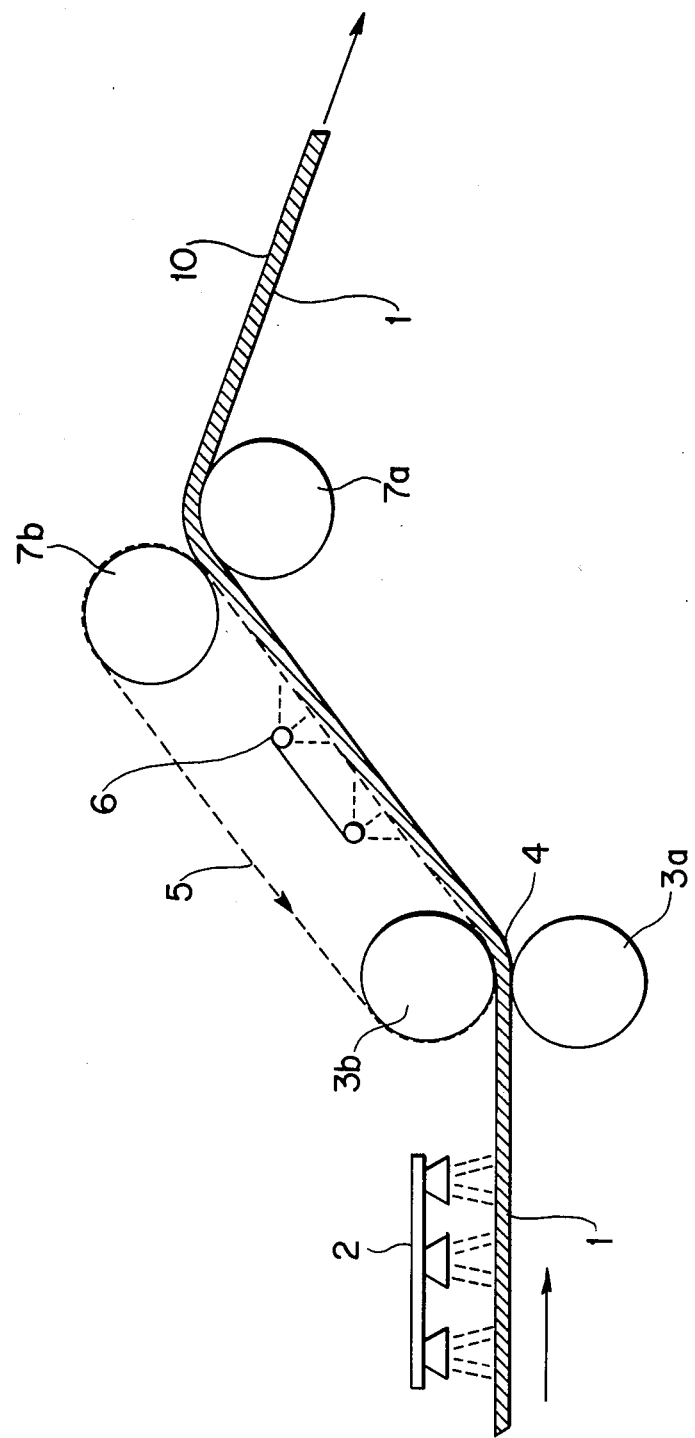

PROCESS FOR EMBOSSING FLEXIBLE SHEETS OF FOAM MATERIAL

This is a continuation of application Ser. No. 559,699, filed Dec. 9, 1983, now abandoned.

This invention relates to a process for embossing the surface of flexible sheets of foam material optionally laminated to a synthetic resin sheet or a flat textile form, wherein the sheet of foam material is superficially plasticized by heating and exposed to an embossing pressure by means of an embossing device in accordance with a desired embossing pattern.

Embossing of the surfaces of sheets of foam material to improve surface quality, on the one hand for esthetic reasons and on the other hand to improve the quality, is conventional and is executed, in particular, with embossing rolls. Compacting of the surface occurs in the region of the embossing zone and, depending on the embossing pressure and depth of penetration, a variously embossed surface is obtained. A disadvantageous factor in embossing foam materials by means of embossing rolls is that the flexible foam material does not completely enter into the relief texture or configuration of the embossing rolls and, thus, is not exactly molded, in part, since the air remaining in the relief texture elements cannot escape and a complete molding of the foam material in the embossing structure is prevented.

The invention is based on the object of providing a continuous process for embossing flexible foam material sheets and making it possible to effect fine as well as coarser embossings with a satisfactory and complete molding of the surface.

In this context, the process of this invention proposes to impress a perforated, metallic embossing belt into the surface of the sheet of foam material, and to remove the belt after cooling and solidification of the surface of the foam material sheet. This perforated embossing belt has the advantage that venting is automatically afforded due to the perforations, and a desired, uniform molding of the foam is made possible without limitation due to dammed-up or trapped air. At the same time, the process of this invention provides that, although the foam is compressed during embossing, the foam expands again to its original thickness after termination of the embossing step and, due to the embossing, a minor increase in thickness may occur in dependence on the embossing pattern, on account of the free molding action, without confining means; i.e., counter surfaces, baffles or the like elements on the opposite side of the foam material.

An advantageous further development during the entire period of the embossing process, according to this invention, provides that the impressed embossing belt is cooled during the impressing period. In a continuous process, it is thus made possible to maintain relatively high embossing speeds and simultaneously to obtain a uniform embossed surface; the embossing belt, after all, being removed only after solidification of the contacting surface of the foam and the rapid solidification being attained by cooling the metallic embossing belt, for example, with air.

In order to attain satisfactory embossing patterns and embossed textures, it is proposed, in case of a flexible foam sheet, to compress the sheet at the beginning of the embossing step by about 15–25% of its thickness. Preferably, all of the devices participating in the embossing step and coming into contact with the foam sheet are maintained in a relatively cold condition; i.e., at room temperature. Only the surface of the foam sheet to be embossed is heated into the plastic range. The process of this invention can be used with special advantage for crosslinked polyolefin foam sheets, wherein the surface of the crosslinked polyolefin sheets is heated to about 150°–180° C.

An especially advantageous embodiment of the embossing belt to be utilized with the process of this invention is a wire mesh with open mesh widths of about 0.5–3 mm, constructed as an endlessly revolving belt, especially of stainless steel wire. Such a wire mesh has the advantage that it easily enters the surface of the foam sheet and provides satisfactory venting and penetration of the foam material into the interstices of the mesh. Also, the embossing pattern can thus be selected within wide limits, by way of the chosen wire thicknesses and wire spacings; i.e., the so-called mesh numbers. The wire mesh is welded into an endless embossing belt. Medium and coarse wire mesh structures with mesh numbers of about 25 to 10 have proven themselves well. Preferably soft elastic foam sheets which have a compression stress at 25% deflection measured according to DIN 53577 of 25 to 300 $KN/m^2$ according to a foam density of 25 to 130 $kg/m^3$, prefered range 25 to 70 $KN/m^2$ according to a foam density of 25 to 50 $kg/m^3$. The foam sheets have preferably closed cells.

It is possible by means of the process of this invention to emboss nonlaminated foam sheets as well as foam sheets laminated with thin synthetic resin films or flat textile forms. Advantageously, for example, polyolefin foam sheets can be laminated with polyethylene films having a very small thickness of about 200–500 $\mu m$, resulting due to heating during embossing and the elastic recovery of the film effected during the subsequent cooling step in a smooth, profiled surface which has a very good handle and is soft. According to a further development of the invention, it is proposed to apply, simultaneously with the impression of the embossing belt, a synthetic resin film or a flat textile form to the foam sheet, so that no additional laminating step is required.

It is also possible to provide the embossing belt with an ink application for printing the foam sheet so that the embossed surface is imprinted simultaneously with the embossing in the zone of the depressions, where the ink is protected.

The invention will be described in greater detail with reference to one embodiment shown in the accompanying drawing wherein:

The single FIGURE is a schematic view of a device and of the progression of steps for the embossing of a flexible foam sheet.

The process of this invention is conducted as an endless embossing procedure for flexible foam materials, especially crosslinked polyolefin foams, such as crosslinked polyethylene foam materials, which exhibit high elasticity.

The sheet 1 of foam material which—if it comes directly from manufacture—should no longer contain any residual heat, is reheated superficially by means of a heater 2, for example, a quartz radiator or ceramic radiator, until the exposed surface begins to become plasticized. This temperature lies, in case of crosslinked polyolefin foam sheets, at about 160°–170° C. The pair of rolls 3a, 3b provide an inlet nip 4 for the foam, the spacing or size of this inlet nip being about 15–25% smaller than the thickness of the foam sheet 1. The two rolls 3a, 3b are driven and are in a cold condition; i.e., at room temperature. The roll 3b is fashioned as a pressure roll and can be further cooled, if it heats up too much due to the heated foam sheet 1 at very high speeds of revolution. Furthermore, the endlessly rotating embossing belt 5 is guided around the rolls 3b, 7b; this belt is constructed as a metallic, perforated band, preferably of wire mesh. In the spacing between the rolls 3b and 7b, the embossing belt 5, impressed into the surface of the foam sheet, revolves while contacting the foam sheet and is cooled along this air zone by the ambient air. If cooling is inadequate at high transportation speeds and with an air zone which is too short, a cooling means 6 can be additionally provided, for example, means for providing additional air cooling (e.g., air jets) which acts in particular on the embossing belt 5. It has been found that heating of the roll 3b and of the embossing belt 5 to temperatures above 50° C. to 60° C. should be avoided in order to obtain a perfect, uniform embossed texture. Since the embossed foam sheet should be in a solidified state at the moment of leaving the belt, it is important, not to raise the processing temperature too high. Therefore, a low belt temperature serves for a quick cooling of the embossed foam sheet and surface and reduces the total length of the belt. The roll 7b serves simultaneously as a tensioning roller for the revolving embossing belt 5 and is likewise driven. Furthermore, roll 7a can be driven or not and serves to deflect the foam sheet away from the belt (a take-up device, not shown, acts to take-up the sheet). Depending on the foam quality and the thickness of the foam, it is possible, for example, to perform the continuous process of this invention by means of the illustrated device with a speed of about 5–20 m/min. The duration of heating and also the degree of plasticizing depend on the quality of the foam; higher weights per unit volume must be heated somewhat more vigorously. The required amount of heat also depends on the color of the foam and on the fineness or coarseness of the desired embossed texture. Heating of the surface can be effected, as illustrated, for example by means of infrared radiators which can be varied in their spacing and heating power, but also, for example, directly by contact heating via rolls.

It is also possible, for laminating the foam surface, to provide at the same time that the embossing step takes place a laminating material downstream of the heating unit directly into the inlet nip 4 between the rolls 3a and 3b on top of the heated foam surface and subject this arrangement to embossing. The laminating material, for example, a synthetic resin film or a textile panel such as a mat or woven fabric, also printed fabrics of cotton or synthetic fibers, should, however, be capable of being shaped and should adhere, if at all possible, to the foam material without any additional adhesives.

The embossed texture attainable depends, on the one hand, on the quality of the flexible foam material which, in particular, is also determined by its weight per unit volume, and, on the other hand, on the type and structure of the perforated embossing belt. The embossing belt 5 can be a punched metal sheet as well as a wire mesh. In the case of a wire mesh, the so-called profile factor is derived from the ratio of inside mesh width- :wire diameter; in this connection, medium and coarser wire meshes yield good surface qualities in embossed texture.

What is claimed is:

1. A process for the continuous embossing of the surface of a flexible foam sheet, optionally laminated with a synthetic resin film or a flat textile form, which comprises plasticizing a surface of the foam sheet by heating and subjecting the heated surface to an embossing pressure by an embossing means having a desired embossing pattern, said embossing means comprising an endless perforated metallic belt guided between a first roll and a second roll spaced from each other; said embossing pressure being provided by the perforated, metallic embossing belt that is impressed into the heated surface of the foam sheet by said first roll and that is removed from the foam sheet upon passing the second roll after cooling and solidification of the embossed surface of the foam sheet; said foam sheet being compressed during the initial stage of embossing by about 15–25% of its thickness and said metallic embossing belt being impressed into the heated foam sheet during said initial stage of embossing; the embossing belt being a belt that revolves around the spaced rolls, each of said rolls comprising one of a pair of driven rolls through which the foam sheet is passed.

2. The process according to claim 1, wherein the embossing belt that is impressed into the foam sheet is cooled during the period of impressing the belt.

3. The process according to claim 1, wherein the embossing belt comprises a wire mesh having an inside mesh width of about 0.5–3 mm and is in the form of an endlessly revolving belt.

4. The process according to claim 1, wherein the first pair of driven rolls to contact the foam sheet also acts to compress the foam sheet and to impress the embossing belt into the heated surface of the foam sheet.

5. The process according to claim 4, wherein the second pair of driven rolls to contact the foam sheet has one roll which serves to deflect the foam sheet away from the embossing belt to promote separation and removal of the belt from the foam sheet.

6. The process according to claim 1, wherein the foam sheet and the embossing belt are additionally cooled by jets of air directed onto the belt and embossed surface of the foam sheet.

7. The process according to claim 1, wherein the foam sheet is a crosslinked polyolefin foam sheet and the exposed surface of the sheet is heated to surface temperatures of about 150°–180° C.

8. A process according to claim 1, further comprising applying, simultaneously with impressing the embossing belt, a synthetic resin film or a flat textile form onto the foam sheet to thereby laminate the film or textile form onto the foam sheet.

9. The process according to claim 1, wherein the foam sheet has a compression stress at 25% deflection measured according to DIN 53577 of 25 to 300 KN/m² according to a foam density of 25 kg/m³ to 130 kg/m³, preferably 25 to 70 KN/m² according to a foam density of 25 to 50 kg/m³.

10. The process according to claim 1, wherein the embossing belt comprises a wire mesh having a mesh number of about 25 to 10.

11. A process according to claim 1, wherein venting of air from the compressed foam sheet occurs via perforations in said metallic belt during transportation of the foam sheet between said first roll and said second roll.

12. A process for the continuous embossing of one side of a flexible foam sheet which comprises the steps of heating the surface of the foam sheet on said one side, impressing a perforated metallic embossing means having a desired embossing pattern into the heated surface of the foam sheet to emboss the surface with said embossing pattern, said embossing means comprising an endless perforated metallic belt guided around a first roll and a second roll, spaced from each other, and said metallic belt being impressed into the heated surface of the foam sheet by said first roll, cooling the embossing belt and the embossed surface of the foam sheet to effect solidification of the foam sheet surface, and removing the cooled embossing belt from said solidified embossed surface as the belt passes the second roll; said foam sheet being compressed during the initial stage of the impressing step by about 15 to 25% of the original thickness of the sheet.

13. The process according to claim 12, wherein the endless belt formed of a wire mesh having an inside mesh width of about 0.5–3 mm is revolved around said rolls.

14. The process according to claim 12, wherein the foam sheet is allowed to expand to the original thickness after removal of said embossing means.

15. The process according to claim 12, wherein the embossing belt is maintained at room temperature during the impressing step by directing jets of air onto said embossing belt.

16. The process according to claim 12, further comprising laminating a thin synthetic resin film or flat textile form onto the heated surface of said foam sheet during the impressing step.

17. The process according to claim 12, wherein the belt is made of wire mesh, the foam sheet comprises crosslinked polyolefin and the surface of the foam sheet is heated to about 150° to 180° C. prior to impressing the endless revolving belt of wire mesh into said heated surface.

18. The process according to claim 17, wherein the embossing means is maintained at room temperature during the impressing step.

19. The process according to claim 18, wherein the foam sheet is transported at a speed of about 5–20 m/min. with the endless revolving belt being guided at one end around one of an initial pair of driven rolls, the initial pair of rolls acting to compress the foam to 15 to 25% of its thickness and then around another roll of a second pair of driven rolls at the other end, so that the belt is tensioned between the pairs of driven rolls during embossing of the surface of the foam sheet.

* * * * *